United States Patent [19]
Lui

[11] Patent Number: 5,644,868
[45] Date of Patent: Jul. 8, 1997

[54] PLANT CONTAINER WATER-KEEPING ASSEMBLY

[76] Inventor: To Yan Lui, Room 3301, Block B, Kaitin Tower, Kaitin Road, Lamtin, Kowloon, Hong Kong

[21] Appl. No.: 407,186

[22] Filed: Mar. 21, 1995

Related U.S. Application Data

[63] Continuation-in-part of Ser. No. 315,416, Sep. 29, 1994, abandoned.

[51] Int. Cl.$^6$ ............................................. A01G 31/02
[52] U.S. Cl. ............................................. 47/81; 47/79
[58] Field of Search ......................... 47/79 D, 81 D, 47/66 D, 66 R, 81 R, 79 R

[56] References Cited

U.S. PATENT DOCUMENTS

| 515,032 | 2/1894 | Vestal | 47/66 D |
|---|---|---|---|
| 4,027,429 | 6/1977 | Georgi | 47/66 D |
| 4,236,351 | 12/1980 | Smith | 47/79 D |
| 4,527,354 | 7/1985 | Sellier | 47/81 D |
| 5,081,790 | 1/1992 | Hinton | 47/81 D |
| 5,136,806 | 8/1992 | Kang | 47/66 D |

FOREIGN PATENT DOCUMENTS

| 3727463 | 5/1988 | Germany | 47/66 D |
|---|---|---|---|
| 8702637 | 6/1988 | Netherlands | 47/79 D |
| 95840 | 5/1939 | Sweden | 47/66 D |
| 403460 | 12/1933 | United Kingdom | 47/79 D |

*Primary Examiner*—Terry Lee Melius
*Assistant Examiner*—Joanne C. Downs
*Attorney, Agent, or Firm*—Gunn, Lee & Miller, P.C.

[57] ABSTRACT

A water-keeping assembly (109) for a plant container (110), which assembly (9) comprises a perforated partition (111) arranged to extend across the bottom of a said container (110) for dividing the interior of the container (110) into an upper compartment for holding therein soil and a lower compartment for collecting therein any water drained down from the soil through the partition (111). The assembly (109) includes ventilation tubes (112) arranged to extend upwards from the partition (111) so that air can reach from above into the lower compartment. The assembly (109) further includes water absorbent bars (113) arranged to pass from the lower compartment through the partition (111) into the upper half of the upper compartment for bringing water collected below the partition (111) upwards into the soil above the partition (111) through capillary action.

9 Claims, 6 Drawing Sheets

PLANT CONTAINER WATER-KEEPING ASSEMBLY

This application is a continuation-in-part application of U.S. patent application Ser. No. 08/315,416, filed Sep. 29, 1994, now abandoned.

The present invention relates to a water-keeping assembly for a plant container and to a plant container incorporating such an assembly.

SUMMARY OF THE INVENTION

According to a first aspect of the invention, there is provided a water-keeping assembly for use in a plant container, which assembly comprises a perforated partition arranged to extend across the bottom of a said container for dividing the interior of the container into an upper compartment for holding therein soil and a lower compartment for collecting therein any water drained down from the soil through the partition, ventilation means arranged to extend upwards from the partition so that air can reach from above into the lower compartment, and at least one water absorbent bar arranged to pass from the lower compartment through the partition into the upper half of the upper compartment for bringing water collected below the partition upwards into the soil above the partition through capillary action.

Preferably, the ventilation means extends from the partition at a position off the periphery of the partition.

Preferably, the partition has depending legs for supporting the partition in position inside a said container.

It is preferred that the ventilation means is in the form of at least one tube upstanding from the partition.

Preferably, the tube is formed by a plurality of sections arranged to be joined in an end-to-end configuration.

In a preferred construction, the perforated partition has a plurality of notches around its periphery in order to form corresponding holes with the inner side of said plant container.

It is an advantage that the water-keeping assembly further includes a floatable marker for indicating the amount of water collected in the lower compartment, said marker extending through the ventilating means.

In a first preferred embodiment, the water absorbent bar is in the form of a roll of water absorbent material.

In a second preferred embodiment, the water absorbent bar has a perforated hollow body which is to be filled with water absorbent material.

More preferably, the water absorbent material is packed to form a core contained by the hollow body.

Advantageously, the water absorbent material is resistant to rottening by water.

It is convenient that the water absorbent material is provided by soil.

Preferably, the hollow body of the water absorbent bar has relatively more or larger perforations at the upper end than the lower end of its portion above the partition.

In a preferred embodiment, the lower end of the portion of the hollow body above the partition is not perforated.

According to a second aspect of the invention, there is provided a water-keeping assembly for use in a plant container, which assembly comprises a perforated partition arranged to extend across the bottom of a said container for dividing the interior of the container into an upper compartment for holding therein soil and a lower compartment for collecting therein any water drained down from the soil through the partition, ventilation means arranged to extend upwards from the partition so that air can reach from above into the lower compartment, and a water absorbent device arranged to pass from the lower compartment through the partition into the upper compartment for bringing water collected below the partition upwards into the soil above the partition through capillary action, said water absorbent device having a perforated hollow body which is to be filled with water absorbent material.

Preferably, the water absorbent material is provided by soil.

According to a third aspect of the invention, there is provided a plant container in combination with the aforesaid water-keeping assembly.

Preferably, the plant container comprises a body having a closable drain hole at the bottom wall thereof.

BRIEF DESCRIPTION OF DRAWINGS

The invention will now be more particularly described, by way of example only, with reference to the accompanying drawings, in which.

DETAILED DESCRIPTION OF PREFERRED EMBODIMENTS

Figure 1:
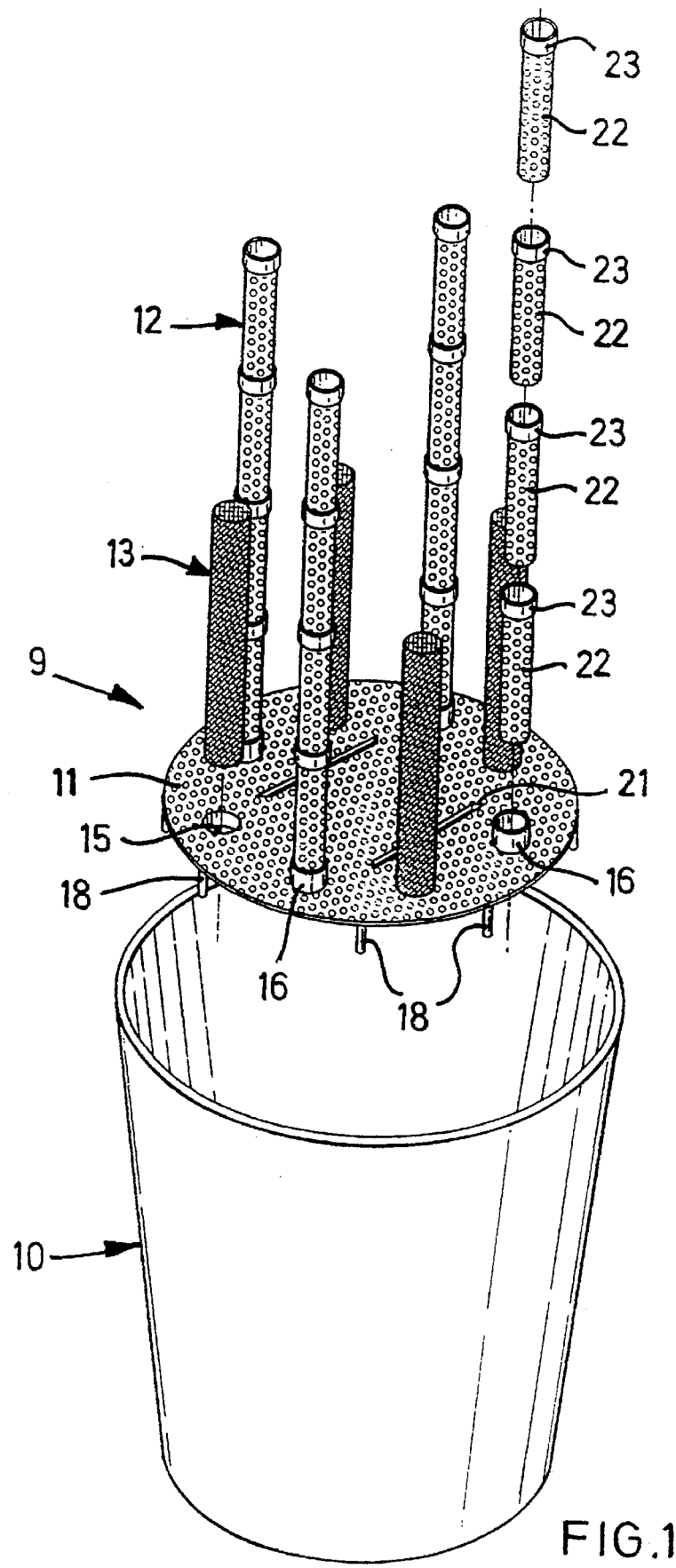
FIG. 1 is a partially exploded perspective view of a first embodiment of a water-keeping assembly and a plant container incorporating the assembly, in accordance with the invention.
Figure 2:
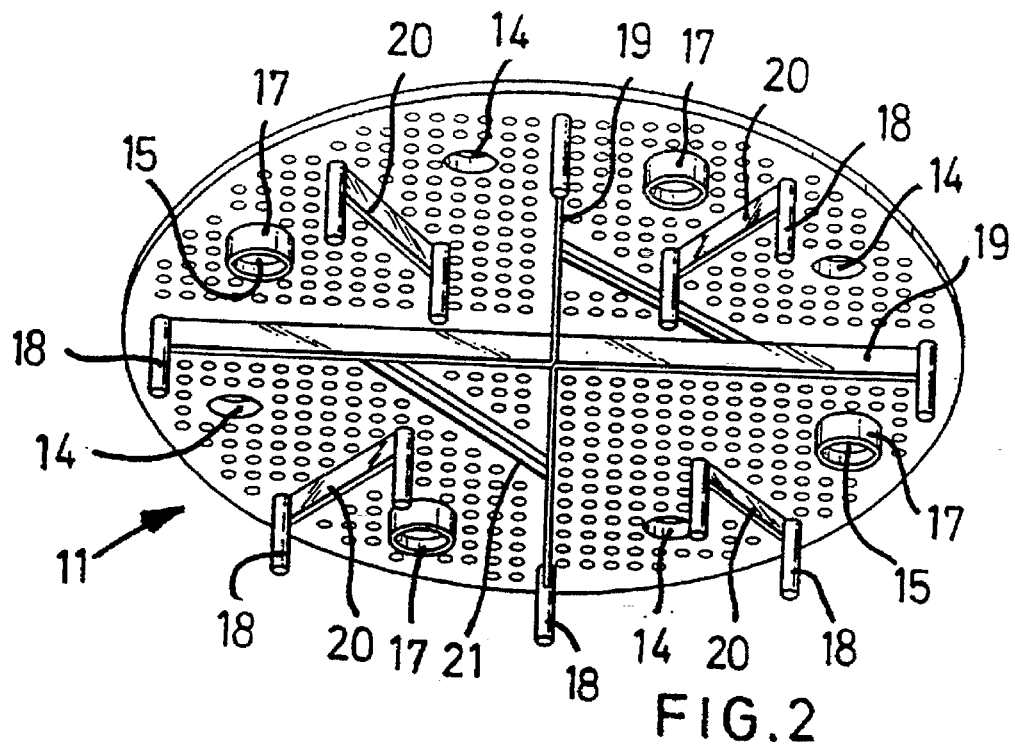
FIG. 2 is a bottom perspective view of a partition of the water-keeping assembly of FIG. 1.
Figure 3:
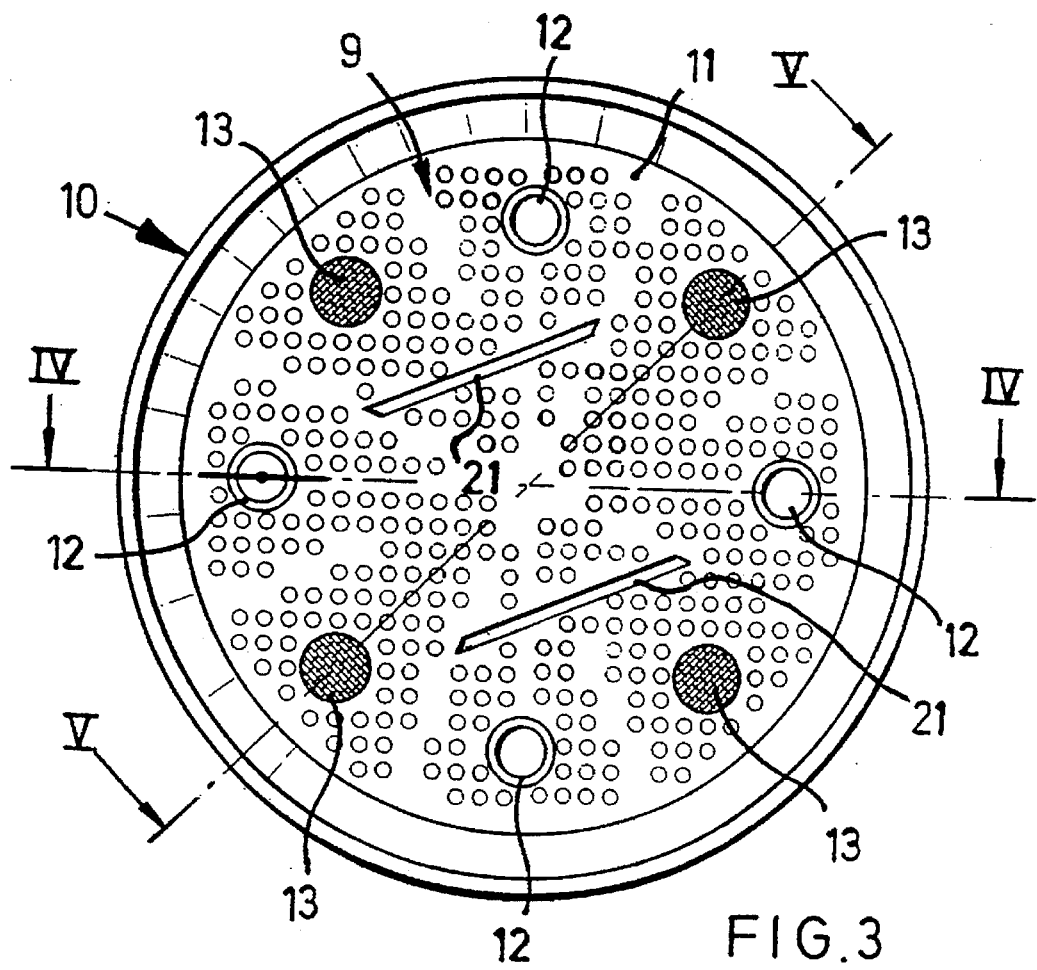
FIG. 3 is a plan view of the plant container of FIG. 1.

Referring firstly to FIGS. 1 to 5 of the drawings, there are shown a water-keeping assembly 9 and a plant container or pot 10 incorporating the assembly 9, embodying the invention. The pot 10 is similar to a conventional pot moulded from plastics material but does not have any water drain hole at the bottom. The water-keeping assembly 9 is formed by a horizontal circular perforated partition 11, four equi-angularly spaced ventilation tubes 12 and four equi-angularly spaced absorbent bars 13 interlaced with the tubes 12. The tubes 12 and the bars 13 are supported vertically by the partition 11.

The partition 11 has eight equi-angularly spaced holes 14 and 15. Each of every other holes 14 is provided with an upstanding integral peripheral collar 16, and each of the other holes 15 is provided with a depending integral peripheral collar 17. The partition 11 has a dozen of integral legs 18 of equal length, and is strengthened by two relatively long and four relatively short integral depending ribs 19 and 20, each extending from one to the other of an associated pair of radially opposed legs 18. The partition 11 further includes two slots 21 extending at 45° from one relatively long rib 19 to the other, as shown. The perforations on the partition 11 are numerous and have a relatively small size such the plant soil cannot easily leak through.

Each ventilation tube 12 is formed by a series of four sections 22 of equal length joined together in an end-to-end configuration. Each tube section 22 has an enlarged top end 23 for, apart from the uppermost tube section 22, receiving and thereby engaging through a press-fitting action the bottom end of the tube section 22 right above it. For each tube 12, the bottom end of the lowermost tube section 22 is press-fit down into the corresponding collar 16 of the partition 11, whereby the partition 11 supports the whole tube 12 in a vertical position. The wall of the tube sections 22 is perforated, in which the perforations are numerous and have a relatively small size such that plant soil cannot easily leak through.

Each absorbent bar 13 is located by the partition 11 by passing through and thus engaging the corresponding hole 15 and collar 17. The bars 13 are formed by one or more sheets of water absorbent paper or cloth rolled into shape.

In use, the water keep assembly 9 is placed inside the pot 10, with the partition 11 extending horizontally and the legs 18 resting on the base wall of the pot 10. The size of the partition 11 is designed such that the partition 11 will fit with its periphery close to and practically touching the inner side of the peripheral wall of the pot 10. The ventilation tubes 12 have such a length that their open top ends reach near the top opening of the pot 10. The vertical position of the absorbent bars 13 is adjusted such that their bottom ends engage the base wall of the pot 10. In this position, the bars 13 extend upwards into the upper half of the pot interior.

When a plant is put in place, the soil fills up the pot 10 in the upper compartment above the partition 11 to a level below the open top ends of the ventilation tubes 12. Care should be taken not to allow any soil to enter into the tubes 12. The perforations on the partition 11 and the tubes 12 are sufficiently small to avoid any soil leaking therethrough, yet permitting effective air penetration. The portions of the absorbent bars 13 above the partition 11 are in ultimate contact with the soil.

Normal plant watering will unavoidably leave some excess water accumulated at the bottom of a pot, which is conventionally drained away through a hole formed in the base wall of the pot. With the pot 10 of the subject invention, excess water is collected in the lower compartment below the partition 11. The lowermost ends of the absorbent bars 13 are immersed in the collected water, which water is then gradually brought back up to the soil above the partition 11 by way of capillary action through the absorbent bars 13 in order to keep the soil moist to an appropriate degree. The degree of soil moisture keeping is determined by the construction of the absorbent bars 13, including their length and absorbency. Additional moisturising may be effected by, for example, a piece of water absorbent cloth passing through the slots 21 of the partition 11.

The ventilation tubes 12 serve to provide a vent passage to permit ventilation of the lower compartment in order to avoid the growth of any bacteria in the water collected inside the pot 10, which will otherwise rotten the root of the plant. The use of the perforated partition 11 and tubes 12 will also extend the soil-to-air interface area, thereby promoting healthier growth of the plant.

Figure 4:
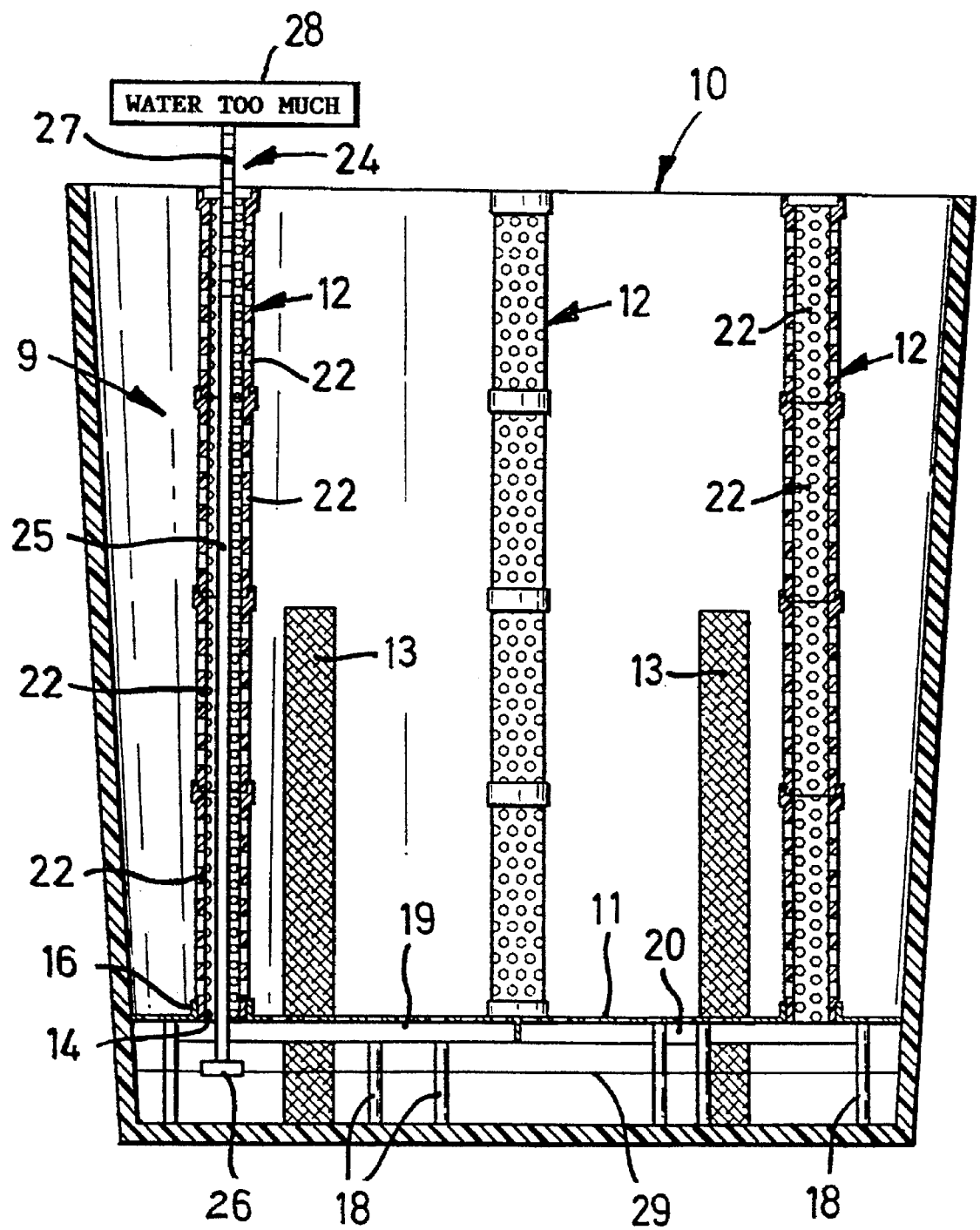
FIG. 4 is a cross-sectional side view of the plant container of FIG. 3, taken along line IV—IV.
Figure 5:
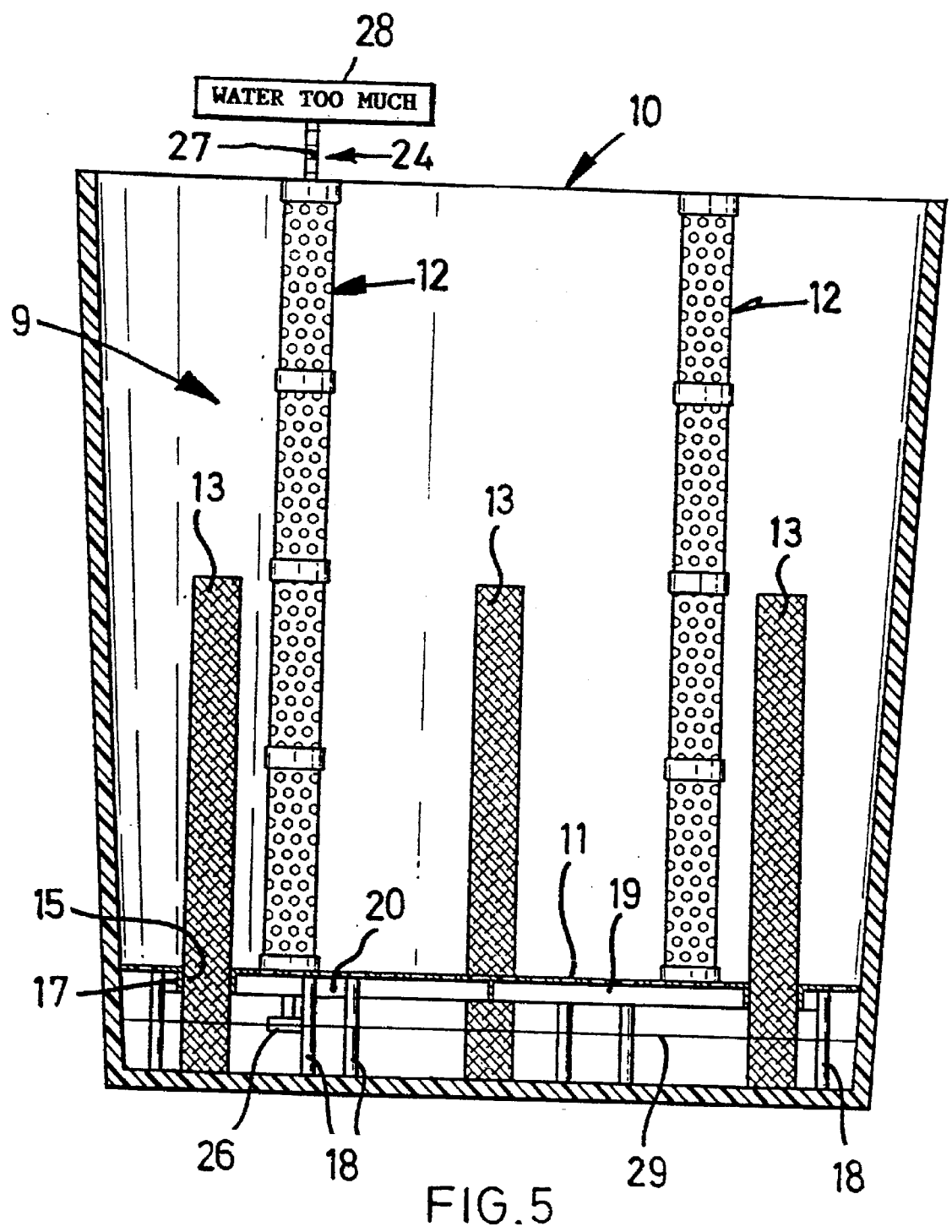
FIG. 5 is a cross-sectional side view of the plant container of FIG. 3, taken along line V—V.

The water-keeping assembly 9 further includes a floating marker 24 in the form of a stick 25, as shown in FIGS. 4 and 5, which is located passing wholly through one of the tubes 12. The bottom end of the stick 25 is fitted with a cork 26 which is floating on the surface 29 of the water collected in the lower compartment. The upper end of the stick 25 is marked with a series of water level graduation lines 27 and a top flag 28 marked "WATER TOO MUCH". The graduation lines 27 are to be read against the uppermost end of the associated tube 12, and together with the flag 28 serves to indicate the approximate amount of water collected in the lower compartment.

In a slightly different embodiment, the pot 10 has a side hole at the bottom, which is provided with a rubber stopper or cap, for if necessary draining excess water out of the lower compartment.

Figure 6:
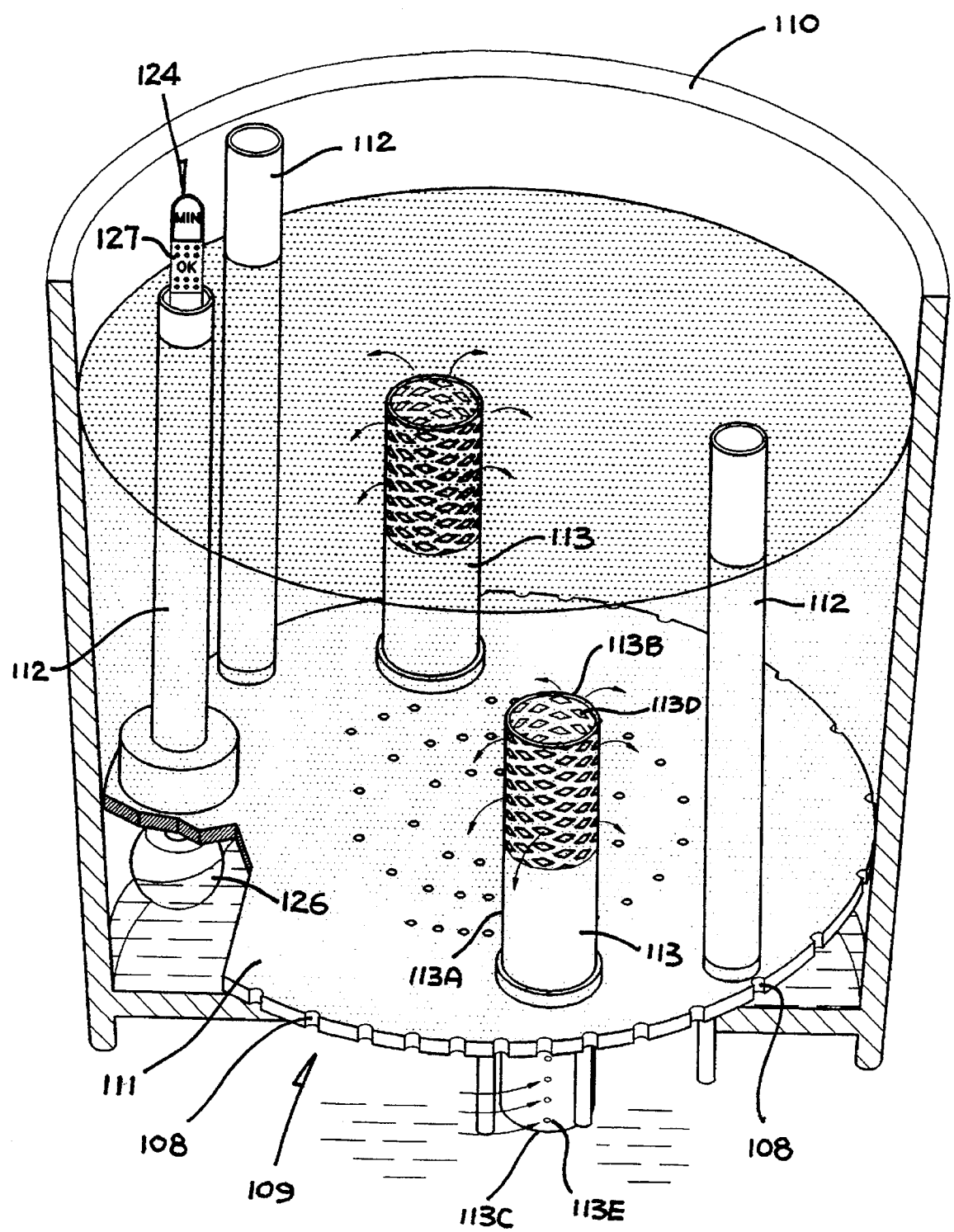
FIG. 6 is a partially broken away perspective view of a second embodiment of a water-keeping assembly and a plant container incorporating the assembly, in accordance with the invention.
Figure 7:
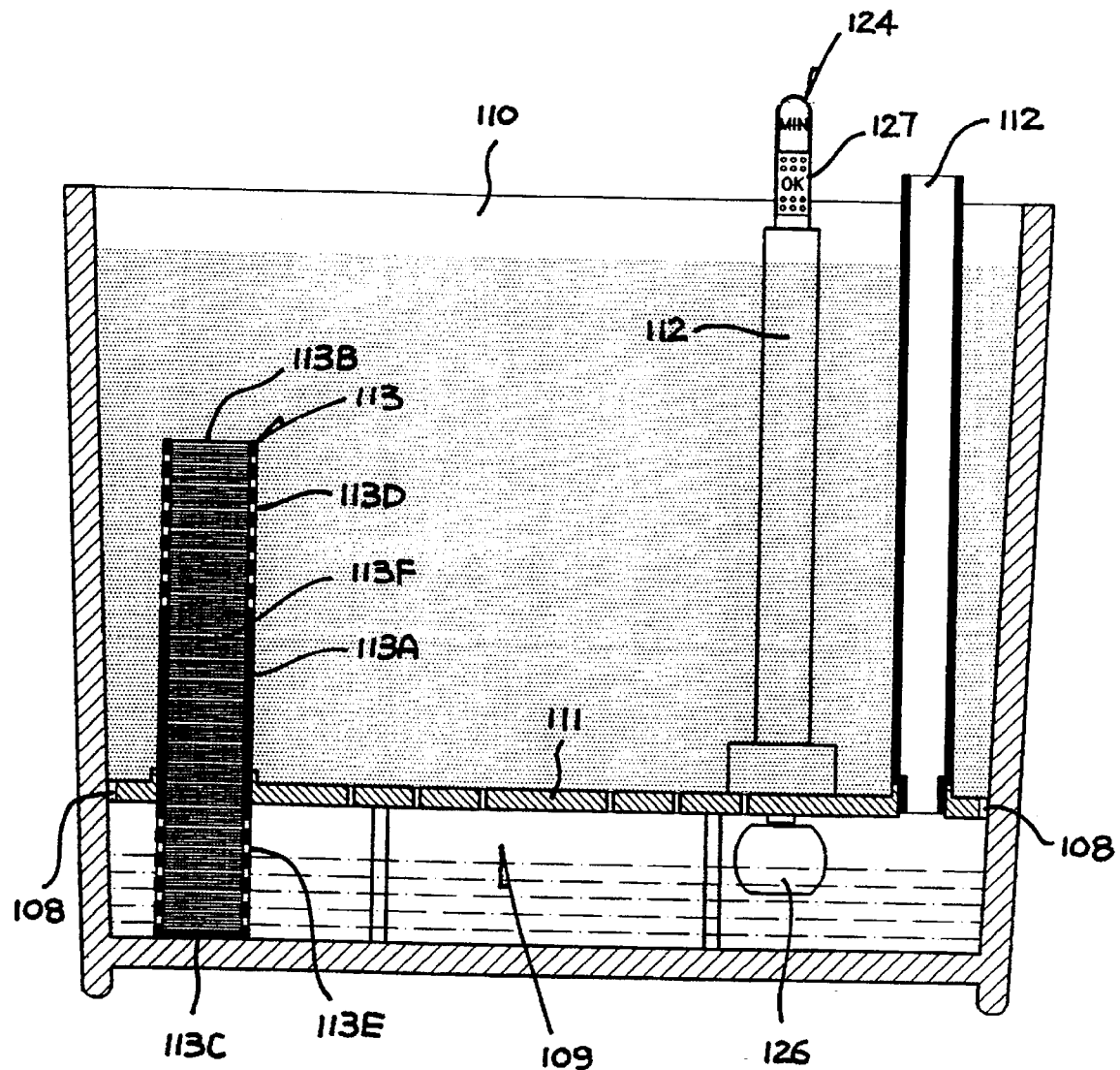
FIG. 7 is a cross-sectional side view of the plant container of FIG. 6.

Referring now to FIGS. 6 and 7 of the drawings, there are shown another water-keeping assembly 109 and a slightly different plant pot 110 incorporating the assembly 109, embodying the invention. The water-keeping assembly 109 has an arrangement similar to that of the earlier assembly 9, namely being formed by a horizontal perforated partition 111, three (instead of four) spaced apart ventilation tubes 112 and two (instead of four) diametrically opposite absorbent bars 113, said tubes 112 and bars 113 being likewise located upright by the partition 111.

The tubes 112 have solid walls so that the plant soil cannot leak through to enter into the compartment below the partition 111 where water is collected. One of the tubes 112 accommodates a floating marker 124 which is similar to the earlier marker 24, except having at its top end three short sections 127 marked "MIN", "OK" and "MAX" to indicate the level/amount of the collected water and having at its bottom end a plastic bulb 126 to effect floating.

The absorbent bars 113 have a plastic tubular body 113A having an open top end 113B and a closed bottom end 113C. Numerous small perforations 113D are formed over the upper end section (about one-third of the body length) of the tubular body 113A. Two diametrically opposite lines of holes 113E are formed over the lower end section (about one-third of the body length) of the tubular body 113A. The middle section of the tubular body 113A has a solid wall. Each absorbent bar 113 is fully pre-filled with soil which is rammed/pressed to become a packed core 113F capable of absorbing and holding water through capillary action.

In use, the cores 113F of the absorbent bars 113 are initially soaked with water. The bars 113 are held in position by the partition 111 such that the lower end section bearing the holes 113E is below the partition 111. The middle sections of the bars 113 stand above the partition 111, with the upper end sections bearing the perforations 113D extending into the upper half of the soil in the plant pot 110. Water collected in the lower compartment is absorbed into the soil cores 113F through the bottom holes 113E and then delivered up through the soil cores 113F by way of capillary action and finally disperses out through the perforations 113D into the upper half of the soil in the plant pot 110, as indicated by arrows in FIG. 6.

Accordingly, the soil in the plant pot 110 is maintained in a suitably moisten condition by the water collected in the lower compartment through operation of the absorbent bars 113. The middle sections of the bars 113 are not perforated so as to stop water coming out of the cores 113F too soon or at a level which is too low, otherwise the water may never or not easily reach the upper half or top part of the plant soil which is the part most readily to lose moisture. The water reaching the top part of the plant soil will disperse downwards anyway, whereby the plant soil will be kept suitably moist from top to bottom.

The top ends of the absorbent bars 113 (or 13) should preferably reach into the top layer, say within 50 mm thick, of the soil in the plant pot 110 (or 10) in order to provide the best moisturising effect.

The use of soil in the absorbent bars 113 is preferred because soil is readily available—soil is going to be used for planting anyway. Also, soil is naturally resistant to rottening by water. Alternatively, the bars 113 may be pre-filled with any suitable material, for example sand or chalk powder, other than soil so long as such other material is water-absorbent and rot-resistant.

For deep plant pots or in order to maintain a dedicated moisture keeping pattern, the body of the absorbent bars 113 may have perforations over the entire length above the partition 111, said perforations having increasing number, density or size in the upward direction in order to supply more water to the outside soil towards the upper end and less water to the outside soil towards the lower end of the bars 113 above the partition 111.

The partition 111 has, around its periphery, small notches 108 to form holes with the inner side of the plant pot 110. Such holes are useful for plant root to reach down into the water collected on the lower compartment. Bearing in mind that plant root has a tendency to grow to find its way along a solid surface, such holes can readily be found by the plant root because the holes are formed right on the inner side of the plant pot 110.

It is envisaged that the partition 11 or 111 may be supported on an annular integral shoulder provided around the inner side wall at the bottom of the plant pot. It is further envisaged that the ventilation tubes 12 or 112 may be provided integrally on the inner side of the peripheral wall of the plant pot. Also, both partitioning and ventilation may be provided simultaneously by a double-walled construction of the plant container, in which case the inner perforated base wall acts as the partition 11 or 111 and the inner (perforated) peripheral side wall acts as the tubes 12 or 112.

The invention has been given by way of example only, and various other modifications of and/or alterations to the described embodiments may be made by persons skilled in the art without departing from the scope of the invention as specified in the appended claims.

What is claimed is:

1. A water-keeping assembly for use in a plant container having a bottom comprising:
a perforated partition arranged to extend across the bottom of said container for dividing the interior of the container into an upper compartment for holding planting soil and a lower compartment for collecting water drained out of the planting soil through the partition, ventilation means arranged to extend upwards from the partition for venting the lower compartment, and at least one water absorbent bar arranged to extend upwards from the lower compartment through the partition into the upper compartment for drawing water collected in the lower compartment upwards into the planting soil in the upper compartment by means of capillary action, said at least one water absorbent bar having a perforated sleeve with a closed bottom end filled with plant material through which the capillary action takes place.

2. A water-keeping assembly as claimed in claim 1, wherein the partition has detachable legs for supporting the partition in position inside said container.

3. A water-keeping assembly as claimed in claim 1, wherein the partition has a plurality of notches around its periphery in order to form corresponding holes with the inner surface of the wall of the plant container.

4. A water-keeping assembly as claimed in claim 1, further comprising a flotatable marker for indicating the amount of water collected in the lower compartment, said marker extending through the ventilation means and having reading markings at an upper end adjacent the ventilation means.

5. A water-keeping assembly as claimed in claim 1, wherein the sleeve is cylindrical.

6. A water-keeping assembly as claimed in claim 1, wherein the planting material in the sleeve is densely packed.

7. A water-keeping assembly as claimed in claim 1, wherein the plant material in the sleeve is substantially similar to said planting soil in the container outside the sleeve.

8. A water-keeping assembly as claimed in claim 1, wherein the number or size of perforations at an upper part of a section of the sleeve above the partition is relatively greater or larger than that at a lower part of the section of the sleeve above the partition.

9. A water-keeping assembly as claimed in claim 8, wherein the lower end of the lower part of the section of the sleeve above the partition is not perforated.

\* \* \* \* \*